Figure 1:
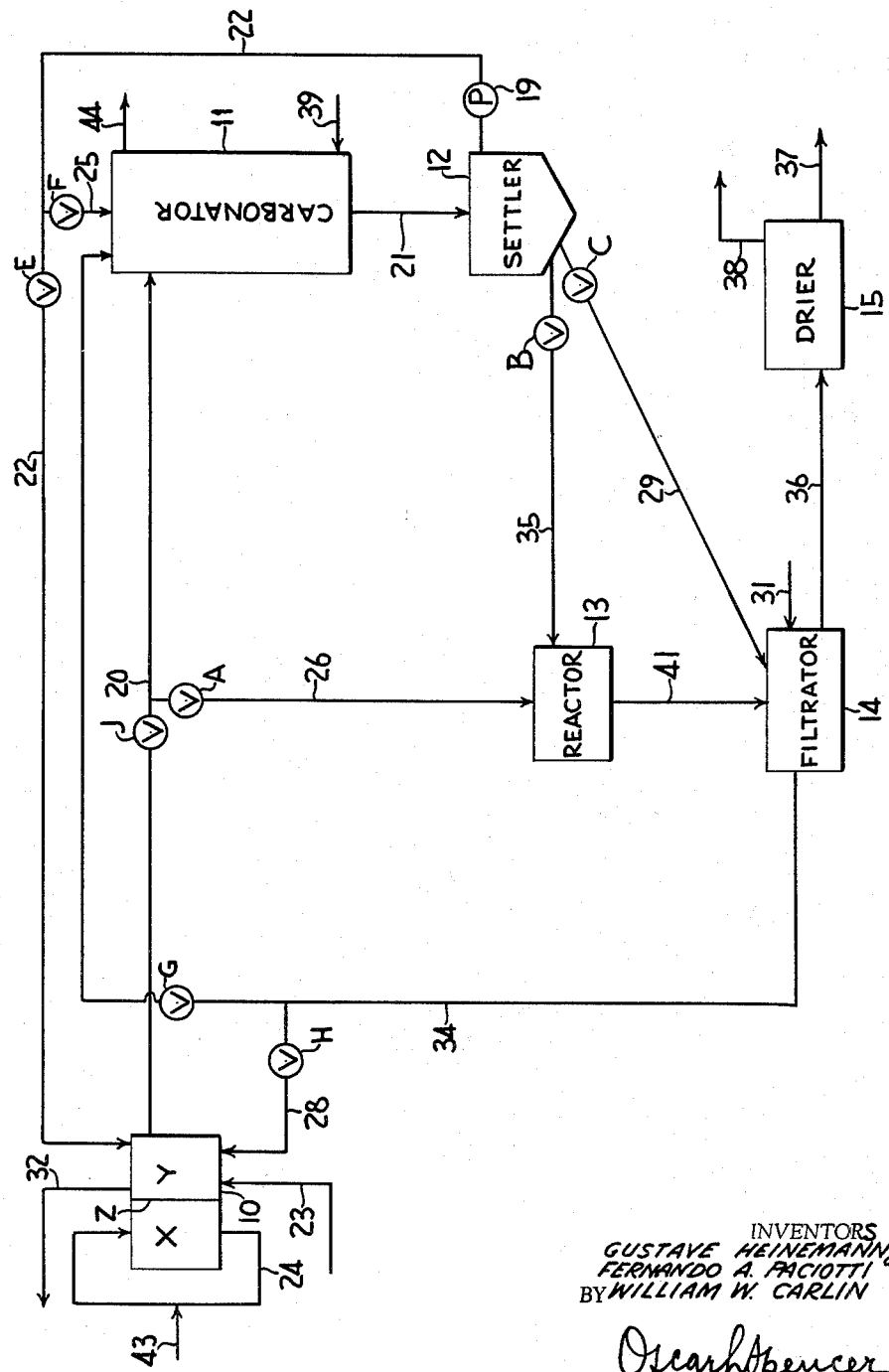

April 20, 1965   G. HEINEMANN ETAL   3,179,579
ELECTROLYTIC PROCESS FOR PRODUCING ALKALI METAL CARBONATES
Filed Sept. 6, 1961   2 Sheets-Sheet 1

INVENTORS
GUSTAVE HEINEMANN and
FERNANDO A. PACIOTTI
BY WILLIAM W. CARLIN

Oscar H Spencer
ATTORNEY

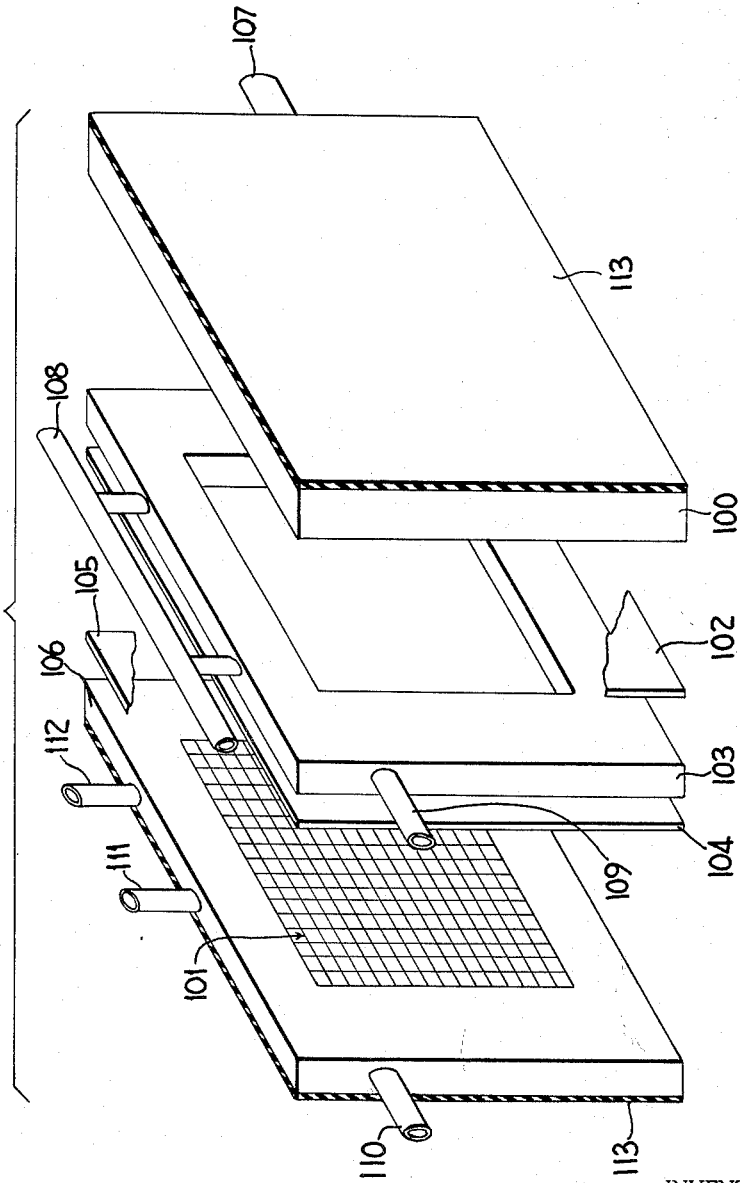

3,179,579
ELECTROLYTIC PROCESS FOR PRODUCING
ALKALI METAL CARBONATES
Gustave Heinemann and Fernando A. Paciotti, Corpus
Christi, and William W. Carlin, Portland, Tex., assignors
to Pittsburgh Plate Glass Company, Allegheny County,
Pa., a corporation of Pennsylvania
Filed Sept. 6, 1961, Ser. No. 136,312
5 Claims. (Cl. 204—87)

This invention relates to the production of carbonates of alkali metals. In particular, this invention relates to a process of electrolyzing alkali metal chloride for the production of chlorine and carbonates of alkali metals.

In commonly assigned, copending application United States Serial No. 29,559, filed May 17, 1960, now abandoned, there is disclosed a process involving the production of alkali metal hydroxide and chlorine from alkali metal chloride solutions by electrolysis in cells utilizing specialized membranes or diaphragms containing thereon specialized coatings. In the cells disclosed in the above-identified application, a saturated brine solution is fed to the anode-containing section of a compartmental cell. Water or an aqueous alkali metal hydroxide solution is fed to the cathode-containing compartment of the cell. The catholyte chamber, or the cathode-containing compartment, and the anolyte chamber, or the anode-containing compartment, are separated from each other by an asbestos diaphragm impregnated with a polymer of an ethylenically unsaturated compound or compounds. The polymers contemplated typically have free acid groups or acid-forming groups thereon.

The electrolyte present in the anode-containing compartment is typically called anolyte. The electrolyte in the cathode-containing compartment is typically called catholyte or cell liquor.

When cells employing this type of polymer containing asbestos diaphragms or a molded sheet of the aforementioned polymers are utilized to electrolyze alkali metal chloride solutions, alkali metal ion migration from the anolyte to the catholyte chamber takes place, resulting in the production of an alkali metal hydroxide solution in the catholyte chamber. Gaseous chlorine is evolved in the anolyte compartment. Alkali metal hydroxide so formed in the catholyte compartment contains little or no alkali metal chloride contaminants. The production of alkali metal hydroxide solution containing little or no alkali metal chloride contaminants is most desirable since it substantially reduces the processing steps normally required to remove chloride contaminants in alkali metal hydroxide produced in normal diaphragm type electrolytic cells.

The process disclosed in the aforementioned United States patent application, the disclosure of which is incorporated herein by reference, desirably serves to substantially reduce the quantity of alkali metal chloride contamination.

It has been found that improved current efficiencies, for example, in excess of 90 percent, many instances greater than 95 percent, are obtainable in cells such as are described in the aforementioned patent application No. 29,559 by maintaining in the catholyte a carbonate ($CO_3^=$) ion to alkali metal ion ratio of from .03 to .49, preferably from 0.1 to .45. In addition, recovery of carbonate values present in the catholyte is enhanced by removing at least a portion of the catholyte as an aqueous solution containing alkali metal hydroxide and carbonate and having an alkali metal concentration of at least 105 grams per liter of catholyte, preferably at least 165 grams per liter, usually no greater than 175 grams per liter, and carbonating the catholyte so removed at a temperature of from 100 to 212° F., preferably from 130 to 200° F., in a carbonation zone outside of the anolyte and catholyte compartments thereby producing alkali metal carbonate, alkali metal bicarbonate and alkali metal sesquicarbonate. As the cell liquor or catholyte is removed from the cell for carbonation, a continuous stream of carbonates of said alkali metal is recycled from the carbonation zone outside of the cell to the catholyte chamber in the cell thereby maintaining the aforesaid carbonate to alkali metal ion ratio in the catholyte.

Carbonate ion as above employed means the carbonate $CO_3^=$ radical in the ionized state or ionically bonded to alkali metal in aqueous solution and as alkali metal carbonate in anhydrous condition. Alkali metal ions as above employed mean alkali metal ion radicals in the ionic state or ionically bonded to hydroxyl or carbonate ions in aqueous solution and as alkali metal hydroxide or alkali metal carbonate in the anhydrous condition.

When carbonation of the catholyte liquor is effected in the above manner, not only is there an improvement in the current efficiency of the cell but there is also a material savings in recovery of the carbonates of the alkali metal formed. In addition, a wide choice of carbonate products may be produced. Still further, the above process is adaptable for the concurrent production of alkali metal hydroxide and carbonates of alkali metals.

Carbonation of the catholyte in a permionic cell during the electrolysis of alkali metal chlorides has resulted in the production of saturated alkali metal carbonate solutions, notably a sodium carbonate solution. Such carbonation is generally effected by introducing carbon dioxide into the catholyte compartment of a cell. If the degree of carbonation exceeds the carbonate's saturation point in water under the conditions prevailing, there is obtained concurrent production of a saturated carbonate solution and a precipitate of alkali metal carbonate. At cell temperatures between 70 to 250° F., an aqueous saturated solution of, for example, sodium carbonate, contains at the lowest temperature about 19 grams of $Na_2CO_3$ per 100 grams of saturated solution. At the highest temperature, viz., 250° F., the concentration is about 29.8 grams of sodium carbonate per 100 grams of saturated solution. The maximum concentration obtainable within this temperature range is about 33.5 grams of sodium carbonate per 100 grams of saturated solution. Concentrating to dryness such a saturated solution to obtain the pure sodium carbonate constitutes a very serious problem. For example, if it is attempted to recover sodium carbonate from an aqueous solution comprising 30 grams of sodium carbonate per 100 grams of saturated solution, it is necessary to remove 70 grams of water. This means that for every mole of anhydrous sodium carbonate obtained, about 13.7 moles of water may be evaporated off. The cost involved in supplying heat to effect such an evaporation is obviously undesirable.

Removal of precipitated sodium carbonate from catholyte liquor requires separation of a solid precipitate from a saturated sodium carbonate solution and necessitates designing special cells allowing convenient withdrawal of the solids from the cell. Furthermore, solid precipitate in the cell causes encrustation of the cathode, thus causing excess power consumption and, eventually, necessitates shutdown of the cell due to membrane and cell failure. In addition to these factors which sufficiently complicate the recovery of soda ash, the aforementioned technique of carbonating in the cell is limited to the production of one product, i.e., alkali metal carbonate. Many of the above difficulties can be materially overcome by the process of this invention, features of which have been described above. Various processes using these features may be employed for the low cost production of a variety of products. Some variations are described below in connection with certain preferred embodiments of this invention and it will become obvious to one skilled in the art from the following description that changes in the preferred embodiments may be made with substantially the same or improved results.

In one preferred embodiment of this invention resulting in the manufacture of alkali metal carbonate, notably sodium carbonate ($Na_2CO_3$), cell liquor having the aforementioned carbonate values, on withdrawal from the catholyte chamber, is split into two portions. One portion of the cell liquor is passed to a carbonating zone maintained at a temperature of from 100 to 212° F. where the liquor is carbonated to produce a mixture of sodium carbonate and sodium bicarbonate. Proper adjustment in the carbonation effects the production of sodium sesquicarbonate. The amount of sodium bicarbonate so produced is preferably at least equimolar to the amount of sodium hydroxide in the other portion of the cell liquor. Carbonation feed liquor is transformed to a slurry in the carbonation zone. The resulting slurry is passed to a settling zone where solids (primarily carbonates of alkali metal) are separated from the supernate. The supernate, which contains considerable sodium carbonate and bicarbonate, is recycled to the catholyte chamber to provide the desired carbonate and hydroxide values in the cell. The settled solids are combined with the other portion of the cell liquor in a reactor. The temperature of the reactor is maintained so as to convert all of the sodium hydroxide and bicarbonate to sodium carbonate. Desirable temperatures are from 96 to 230° F. The resulting slurry of sodium carbonate monohydrate is then filtered and dried to provide anhydrous sodium carbonate. The filtrate is recycled to the carbonating zone.

In another preferred embodiment of this invention, sodium bicarbonate is produced by passing all of the aforementioned carbonated cell liquor to the carbonation zone maintained at 100 to 212° F. The carbonation is adjusted to produce a slurry containing predominant amounts of solid sodium bicarbonate. The resulting slurry is passed to a settling zone wherein solid bicarbonate is concentrated. A portion of the supernatant liquid is passed to the carbonator and a portion is passed to the catholyte chamber, where in conjunction with the hereinafter mentioned filtrates, provides the desired carbonate and hydroxide values. The precipitated bicarbonate solid is then filtered, washed and dried. The filtrate mixed with wash solution is recycled to the catholyte chamber, as mentioned above, to assist in providing the desired carbonate and hydroxide values.

In the above description of the manufacture of sodium carbonate, it is mentioned that control in carbonation results in the production of solid sodium sesquicarbonate. Instead of combining all of the solid sesquicarbonate with the other portion of the cell liquor in the reactor, it is possible to withdraw a part thereof to a dryer and thereby recoved sodium sesquicarbonate.

Preferably, the carbonation is effected at a temperature of from 100 to 212° F. with a considerable amount of water being removed from the cell liquor. Generally, the temperature is achieved by carbonating hot liquor with a $CO_2$-containing gas, preferably boiler flue gas obtained from a natural gas, coal or fuel oil combustion boiler. Boiler flue gas contains large amounts of $CO_2$. The remaining ingredients of the gas are ostensibly inert to the alkali metal materials being treated. As a rule, the flue gas has a temperature of from 100 to 160° F. on introduction to the carbonation zone. The cell liquor is generally introduced into the carbonator at a temperature of from 180 to 200° F. In the preferred operation, the temperature of the cell liquor introduced to the carbonation zone is greater than the temperature of the $CO_2$ gas stream. In this manner, it is possible to remove substantial quantities of water with the off-gases during carbonation.

In most cases, it is desirable to remove catholyte from the cell as a saturated solution. This means that the amount of alkali metal ions, hydroxyl ions and carbonate ions in the solution is at a point where any additional amount would cause precipitation of either alkali metal carbonate and/or alkali metal hydroxide. Of course, this does not preclude the production of a saturated catholyte liquor containing suspended solid alkali metal carbonate and/or hydroxide. The amount of solid product that can be produced in the catholyte chamber is dependent upon the degree of allowable fouling of the catholyte chamber due to precipitation during electrolysis. Good practice precludes precipitation of solid products to the bottom of the catholyte chamber. But if excessive precipitation should occur, it may be removed by resolubilizing the solid products. This may be accomplished by providing a dilute aqueous solution in the catholyte chamber and temporarily passing the recycled carbonate solution to the dilute liquor after the liquor is removed from the catholyte chamber. In some instances, it will be necessary to provide agitation means in the catholyte compartment to effect quick solubilization of the solid alkali metal carbonate and/or solid alkali metal hydroxide. Hydrogen gas evolved at the cathode should provide ample agitation.

On some occasions it may be desirable to produce a dilute aqueous cell liquor, viz., having a carbonate to alkali metal ion ratio of from about 0.03 to 0.1. Though carbonation of such a liquor may be accomplished to effect production of solid carbonates of alkali metal, better practice involves combining carbonate solution used for recycling with this cell liquor prior to the carbonation of the latter solution. In this embodiment, approximately one-half or more of the carbonate solution used for recycle to the cathode compartment to maintain the aforementioned carbonate ion to alkali metal ion ratio is passed, instead, to the carbonation zone or to the cell liquor prior to its carbonation.

In addition to obtaining cell efficiencies in excess of 90 to above 95 percent on adding alkali metal carbonate and bicarbonate to the catholyte to produce a mixture of alkali metal hydroxide and alkali metal carbonate, it has been found that the latter mixture offers a considerable savings in the production of alkali metal hydroxide of high purity. For example, a portion of the liquor, already high in alkali metal hydroxide, may be treated with slaked lime to convert the carbonate to hydroxide using known procedures. Less slaked lime is needed due to the high alkali metal hydroxide content already present in the liquor. More specifically, the cell liquor rich in alkali metal hydroxide may be contacted with a slurry of slaked lime and the reaction product passed to an evaporator for recovery of the hydroxide formed. Slaked lime is thus converted to calcium carbonate on reaction with the alkali metal carbonate. The calcium carbonate may then be decomposed to form carbon dioxide, which is then passed to the carbonation zone, and calcium hydroxide, which is used for further conversion of alkali metal carbonate to the corresponding alkali metal hydroxide. Thus, it is possible to produce one, two or three commercial products at the same time in the treatment of the same cell liquor solution.

These and other advantages will be described below in reference to certain specific embodimnets of this invention. The above discussion has, in general, been specific to the electrolysis of sodium chloride. This is not to be construed as limiting this invention thereto. This invention is equally applicable to the electrolysis of potassium chloride and other alkali metal chlorides.

As illustration of specific embodiments of this invention, the following drawings are submitted but are not to be construed as limiting the invention to the characterizations presented thereon:

FIGURE 1 schematically illustrates various modes for conducting the processes of this invention, and FIGURE 2 is an exploded isometric view of a permionic membrane cell in which the aforementioned electrolytic process may be effected.

Referring to FIGURE 1, electrolysis of an aqueous saturated sodium chloride brine solution is effected in compartmental cell 10, having anolyte chamber X and catholyte chamber Y separated from each other by a permionic membrane Z. The brine solution is introduced via lines 43 and 24 and undecomposed brine is recycled through line 24 and resaturated by additional brine from line 43. Catholyte liquor is created by water introduction through line 23 and solutions comprising carbonates of sodium via lines 22 and 28 as more fully described below.

*Production of soda ash*

In the production of soda ash, the cell liquor solution (catholyte) containing an ion ratio of $CO_3^=$ to $Na^+$ of from 0.03 to 0.49 and a sodium concentration of at least 105 grams per liter is passed from the catholyte chamber Y through line 20 at a temperature of from about 180 to about 200° F. The catholyte in line 20 is split into two streams, one stream being introduced into carbonation tower (or carbonator) 11. The second stream is sent from line 20 via line 26 to a reactor 13. Valves A and J are open during this operation.

Boiler flue gas at a temperature of from 100 to 160° F. is introduced into the bottom of carbonator 11 by way of line 39. As a result, a considerable amount of water is removed from the carbonator through off-gas line 44. From this carbonation, the material in tower 11 may attain a $CO_3^=$ to $Na^+$ ratio of 0.5 to 1.0, and generally an aqueous slurry of sodium sesquicarbonate or an aqueous slurry of sesquicarbonate and $NaHCO_3$ is withdrawn via line 21 from the bottom of tower 11 and introduced into settler 12. The solids in the settler are drawn off the bottom through line 35 to reactor 13. Valve B is open and valve C is closed. The supernate obtained from settler 12, typically an aqueous saturated solution of $Na_2CO_3$ and $NaHCO_3$, is recycled by means of pump 19 to the catholyte compartment Y of the cell 10 to provide the carbonate values essential to effecting this invention. Make-up water is introduced to catholyte compartment Y through line 23.

The molar quantity of $NaHCO_3$ in the reactor is equivalent to the molar quantity of NaOH present in the other portion of the cell liquor. The temperature of the reactor is maintained above 96° F. by the heat of the reactants added thereto or auxiliary heating, such as steam, hot water jacketing or electrical resistors. Preferably, the temperature of the reactor is maintained above 120° F. Reactor 13 can be a rotary or stationary kiln or simply a steel tank having an agitator. The material from lines 26 and 35 can be introduced into one end of the kiln or tank and withdrawn from the other end. By maintaining the temperature of the reactor at or over 96° F., the bicarbonate becomes readily reactable with NaOH to form $Na_2CO_3$, and because of the supersaturation of $Na_2CO_3$, the monohydrate ash slurry is obtained. As a result of holding the temperature above 96° F. and below 230° F., the monohydrate, that is, $Na_2CO_3 \cdot H_2O$ is produced.

The slurry produced in reactor 13 having a temperature above 96° F. is carried via line 41 to filtrator 14. The monohydrate is passed via line 36 to drying means 15 where moisture or water of hydration is removed. A conventional dryer, such as a steam tube dryer, may be so employed. A dense soda ash is the final product recovered by way of line 37. Moisture is evolved through line 38.

The filtrate from filtrator 14, an aqueous saturated solution of $Na_2CO_3$, is recycled via line 34 to the top of carbonator 11. Valve H is closed and valve G is open in this operation.

*Sodium bicarbonate production*

Sodium bicarbonate can be produced by a simple modification of the above method of making soda ash. Thus, in one such modification, the catholyte liquor is introduced to carbonator 11 by way of line 20. In this operation, valve J is open and valve A is closed. The amount of carbon dioxide passed to the base of the carbonating tower 11 through line 39 is in an amount in excess of that theoretically required to convert all of the NaOH and essentially all of the $Na_2CO_3$ to $NaHCO_3$. Desirably, at least one mole of $CO_2$ is added to tower 11 for every mole of $Na_2CO_3$ and for every mole of NaOH in the cell liquor. Under the preferred conditions, there is at least one mole of $CO_2$ and at least one mole of water for each mole of $Na_2CO_3$ and at least one mole of $CO_2$ for each mole of NaOH present in the catholyte liquor. The temperature in the carbonator is conveniently held at 100 to 212° F., preferably from 130 to 200° F.

The resulting slurry is drawn from carbonator 11 by way of line 21 to settler 12. A portion of the supernate form settler 12, containing sodium carbonate and sodium bicarbonate, is recycled to carbonator 11 via lines 22 and 25. Another portion of the supernate is passed via line 22 to the catholyte chamber Y of cell 10. Valves E and F are regulated to adjust the amount of supernate recycled to carbonator 11 and cell 10.

The bicarbonate solids in settler 12 are passed to filtrator 14 through line 29 from settler 12. Valve B is closed and valve C is open. The solids in filtrator 14 are water washed by the addition of a small amount of water through line 31 and the washed solids are passed via line 36 to dryer 15. Moisture from the drying operation is removed through line 38 and anhydrous sodium bicarbonate is recovered via line 37.

The filtrate recovered from filtrator 14, which contains sodium carbonate and sodium bicarbonate, is recycled with wash water added through line 31 to the catholyte compartment Y of cell 10 via lines 34 and 28 respectively. Valve G is closed and valve H is open in this operation.

*Production of sodium sesquicarbonate*

In the aforementioned discussion of soda ash production, it was stated that sodium sesquicarbonate is obtainable as a solid product by carbonation in carbonator 11 and separation in settler 12. This solid product is recovered in filtrator 14 according to the aforementioned bicarbonate process without water addition through line 31. The filtered solids are dried in dryer 15 and recovered as such.

Though the above discussion has related to the passage of catholyte liquor from the cathode compartment to a carbonation zone with recycle of carbonated solution to the same cathode compartment, it is within the contemplation of this invention to pass the carbonated solution to a different cathode compartment of a different cell. For example, catholyte liquor from a first cell is passed to a carbonator. The carbonated solution obtained from this carbonator is passed to the catholyte of a second cell. The catholyte liquor from the second cell is passed to a second carbonator. The carbonated solution from this second carbonator is then passed to the catholyte of the first cell. In this manner, cross-feeding of carbonated solution to establish the $CO_3$ ion to alkali metal ion ratio may be effected in a complex system containing a plurality of electrolytic cells and carbonators.

In the operation of the electrolysis of saturated brine solution, and cell having a permionic membrane may be employed. Cells containing these permionic membranes comprise an anode and a cathode with a permionic membrane separating the two, thereby forming in conjunction with the cell structure an anolyte and catholyte compartment. A typical illustration of such a cell is characterized in FIGURE 2, in which is shown an anode 100 comprising a graphite blade, a rectangular spacer 103 having a hollow interior, a rectangular permionic membrane 104 and another spacer 106 followed by a cathode screen 101, all of which are arranged in series and fastened together. Spacer gaskets are employed to separate the spacer from the anode and the cathode spacer from the membrane. Thus, in FIGURE 2, anode 100 is separated from spacer 103 by gasket 102 having the exact shape of spacer 103. Backing spacer 103 is membrane 104. This membrane is a rectangular sheet having the same rectangular area as graphite blade 100. Separating membrane 104 from cathode screen 101 is gasket 105 and spacer 106, in the order characterized in FIGURE 2. Rubber gaskets 113 are employed for backing the graphite anode and screened cathode. Electrical connections at 107 and the side of the cathode screen (not shown) are provided in the usual fashion. When the various sections are clamped together into one unitary body, the structure has a hollow interior which is characterized by the rectangular hollow of the spacers. This hollow interior would extend from the anode to the cathode except for the presence of the blocking membrane. Thus the membrane establishes an anode chamber and a cathode chamber wherein liquids may flow.

By membrane it is meant to include sheets of polymeric material as previously described, or diaphragms which are coated with said polymeric permionic materials.

Extended through spacer 103 is brine overflow pipe 109 and a brine introduction pipe (not shown in FIGURE 2) diagonally positioned from the brine overflow pipe at the opposite side of the spacer near the bottom thereof. At the top of spacer 103 are chlorine eduction pipes positioned in said spacer so that the chlorine evolved is transported through the spacer and pipes to chlorine header 108. In spacer 106 is pipe 110 for removing cell liquor, pipe 111 for removing hydrogen and pipe 112 for introducing water. Each of these pipes is positioned so as to receive product from or to introduce material into the space representing the catholyte chamber. All of the parts in FIGURE 2 are bolted together to make one unitary structure capable of continuously electrolyzing sodium chloride to produce chlorine gas and cell liquor as described above.

A variety of membranes are employable. A preferred membrane material comprises a maleic anhydride-divinyl benzene-styrene terpolymer, as produced in Example 1 of application Serial No. 29,559, filed May 17, 1960. Other known cross-linked carboxyl containing polymers may be used. Preferably, the resin is coated in an asbestos diaphragm by polymerizing in situ on the surface thereof.

Other membrane materials which are usable include inorganic exchangers such as zeolites, and synthetic organic polymers such as, e.g., sulfonated styrene-divinyl benzene copolymers.

The cell described above may be utilized as a unit of a multi-compartment bipolar cell, as described in the commonly assigned application by Sydney Forbes, Serial No. 848,430, filed October 23, 1959, copending herewith, now abandoned. A plurality of these units inserted back to back in a cell is desirably employed in the large scale production of chlorine and catholyte products as per this invention. Recourse is had to FIGURE 1 in the following example in describing the continuous operation of a specific process embodying the features of this invention.

*Example*

Four cell batteries, each cell battery containing 48 units of the type described in FIGURE 2 positioned in the cell battery in the manner illustrated in application Serial No. 848,430 and having 6 foot by 4 foot anode blades, are lined up in series of fours to produce the cell liquor hereinafter described. The current established through a series of four of these cell batteries is 3000 amperes and the voltage in each of the cells is approximately 4.1 volts. The anode and cathode of each cell is separated by an asbestos diaphragm having coated thereon a terpolymer of maleic acid-divinyl benzene-styrene, produced in accordance with Example 1 of application Serial No. 29,559.

An aqueous saturated NaCl brine solution is continuously added to the anolyte chambers at a rate of 1122.7 pounds per hour. As the cells are operated, the sodium ion production is 36.2 pounds per hour and the temperature maintained in the cells is 194° F. Hydrogen is removed via line 32 as illustrated in the schematic drawing of FIGURE 1. 792.9 pounds per hour of cell liquor at a temperature of 194° F. is withdrawn from the cells to a common header illustrated in FIGURE 1 as line 20. The cell liquor is split up into two portions, 543.1 pounds per hour of which is transported through line 26 and 249.8 pounds per hour through line 20 to carbonation tower 11. The cell liquor contains 21.9 percent sodium carbonate, 5.7 percent sodium hydroxide and 72.4 percent water, basis weight of solution. In this operation, valves J and A are open. Carbonator 11 is a cylindrical steel tank with a height to diameter ratio in feet of 8. The cell liquor is passed by way of line 20 to the top of the carbonating tower. At the same time, boiler flue gas at a temperature of 100° F. is introduced to the bottom of towers 11 at a rate of 293.1 pounds per hour. The flue gas at the stack obtained from the combustion of natural gas has the following composition in percent by weight: 14.5 percent $CO_2$, 72.65 percent nitrogen, 1.03 percent oxygen and 11.84 percent water. Off gas containing a considerable amount of evaporated water at a rate of 40.0 pounds per hour is removed through line 39. The temperature in the carbonator tower is 160° F. The flue gas temperature on introduction is 100° F.

From the bottom of tower 11 is withdrawn a sodium sesquicarbonate slurry at a rate of 861.7 pounds per hour. The slurry is collected in settler 12, which is a sloped bottom, agitated thickener tank. The sodium sesquicarbonate solids in the slurry are passed from settler 12 to reactor 13 via line 35 at a rate of 173.3 pounds of solids per hour. Valve C is closed.

The supernate from the top of settler 12 is recycled via line 22 to catholyte chamber Y with the aid of pump 19 at a rate of 747.1 pounds per hour and contains by weight of solution, 18.3 percent sodium carbonate, 5.5 percent sodium bicarbonate, and 76.2 percent water. Water make up at a rate of 67.8 pounds per hour is introduced to the catholyte chambers of the cells via line 23. Lines 26 and 35 introduce the portions of treated and untreated cell liquor to reactor tank 13 capable of holding 1500 pounds of said material. Reactor 13 is held at a temperature of about 131° F. The average residence time of the material in the reactor is 60 minutes. No external heating is necessary because of the absorbed heat held by the different portions. The material withdrawn from reactor 13 is a monohydrate slurry and is passed to filtrator 14 at a rate of 716.3 pounds per hour via line 41. No water is introduced to filtrator 14 via line 31. The filtrate which is a sodium carbonate solution containing 32 percent by weight of said carbonate is recycled to carbonator 11 by way of line 34. The rate of recycle is 618.8 pounds per hour. Valve G is open and valve H is maintained closed. Solid sodium carbonate monohydrate removed from filtrator 14 is conveyed, at a rate of 97.5 pounds per hour, to dryer 15, which is a rotary kiln. Water is evaporated in dryer 15 and removed by way of line 38 at a rate of 14.2 pounds per hour. Dense soda ash at a rate of 83.3 pounds per hour is recovered from the dryer via line 37.

Though the above describes this invention in terms of specific embodiments, such is not to be construed as limiting the instant invention except insofar as said limitations are found in the following claims.

We claim:

1. In the electrolysis of an aqueous alkali metal chloride solution in an electrolytic cell having a permionic membrane separating the anode from the cathode thereby forming an anolyte chamber and a catholyte chamber respectively, the improvement which comprises maintaining as catholyte an aqueous solution having a $CO_3^=$ ion to alkali metal ion ratio of from 0.03 to 0.49, removing catholyte from said catholyte chamber containing at least 105 grams per liter of alkali metal, carbonate the so removed solution outside of said anolyte and catholyte chambers to produce carbonates of said alkali metal, and recycling an aqueous solution comprising said carbonates to said catholyte chamber.

2. In the electrolysis of an aqueous alkali metal chloride solution in a cell having a permionic membrane separating the anode from the cathode thereby forming an anolyte chamber and a catholyte chamber respectively, the improvement which comprises maintaining as catholyte an aqueous solution having a $CO_3^=$ to alkali metal ion ratio of from 0.08 to 0.42, removing catholyte containing at least 105 grams per liter of alkali metal from said catholyte chamber and carbonating said catholyte outside of said cell to produce solid carbonates of said alkali metal and aqueous solutions comprising carbonates of said alkali metal, and recycling at least a portion of said carbonated solutions to said catholyte chamber.

3. In the production of chlorine and carbonates of sodium, the process which comprises electrolyzing a saturated sodium chloride brine solution in an electrolytic cell having a permionic membrane separating the anode from the cathode thereby forming an anolyte compartment and a catholyte compartment, electrolyzing the aqueous sodium chloride brine solution in said anolyte compartment and aqueous alkali solution comprising sodium ions, carbonate ions and hydroxyl ions in said catholyte compartment, the ratio of carbonate ions to alkali metal ions in said aqueous alkali solution being from .03 to .49, continuously withdrawing a portion of said alkali solution containing at least 105 grams per liter of sodium from said catholyte chamber to a carbonation zone wherein carbonation of said aqueous alkali solution is effected thereby producing solid carbonates of sodium and an aqueous solution comprising carbonates of sodium, recycling solution comprising carbonates of sodium to said catholyte chamber to maintain the aforementioned carbonate ion to sodium ratio and isolating the solid carbonates of sodium.

4. The electrolytic process of producing chlorine in a multi-compartmental electrolytic cell through which an electric current is passing and having the anode in an anode compartment and the cathode in a cathode compartment, said compartments being separated from each other by a barrier comprising a permionic material capable of transporting therethrough sodium ions, but incapable of transporting therethrough substantial amounts of sodium chloride, which comprises providing an aqueous saturated sodium chloride brine solution in said anode compartment, maintaining an aqueous solution containing sodium, hydroxyl and $CO_3^=$ ions in said cathode compartment, the ratio of $CO_3^=$ ions to sodium ions in said solution being from 0.03 to 0.49, removing chlorine from said anode compartment and withdrawing a portion of said solution containing sodium hydroxide, sodium carbonate and at least 105 grams per liter of sodium from said cathode compartment and splitting said portion into two parts, a first part and a second part, carbonating said first part in a carbonation zone thereby producing solid sodium sesquicarbonate and an aqueous solution comprising sodium carbonate and sodium bicarbonate, the amount of sodium bicarbonate in the solids being sufficient so that on mixing said solid sodium sesquicarbonate with the second part of said portion at a temperature above 96° F., the resulting mixture substantially comprises sodium carbonate, mixing said solid carbonate with said second part, filtering the mixture thereby recovering solid sodium carbonate and a filtrate, recycling said filtrate to said carbonation zone, and recycling said aqueous solution comprising sodium carbonate and bicarbonate to said cathode compartment.

5. The electrolytic process of producing chlorine in a multi-compartmental electrolytic cell through which electric current is passing and having the anode in an anode compartment and the cathode in a cathode compartment, said compartments being separated from each other by a barrier comprising a permionic material capable of transporting sodium ions therethrough but substantially incapable of transmitting sodium chloride, which comprises providing an aqueous saturated sodium chloride brine solution in said anode compartment, maintaining an aqueous solution comprising sodium, hydroxyl and $CO_3^=$ ions in said cathode compartment, the ratio of $CO_3^=$ ions to sodium ions in said solution being from 0.03 to 0.49, removing chlorine from said anode compartment and withdrawing a portion of said solution containing at least 105 grams per liter of sodium ions from said cathode compartment and passing said portion to a carbonation zone wherein said solution is carbonated, thereby producing solid sodium bicarbonate and an aqueous solution comprising sodium bicarbonate and sodium carbonate, recycling a portion of said sodium carbonate-sodium bicarbonate solution to said carbonation zone and recycling the remaining portion of said solution to said cathode compartment, filtering said solid sodium bicarbonate, drying the solid sodium bicarbonate and recovering anhydrous sodium bicarbonate, and recycling the filtrate to said cathode compartment of said electrolytic cell.

References Cited by the Examiner

UNITED STATES PATENTS

| | | | |
|---|---|---|---|
| 552,895 | 1/96 | Craney | 204—87 |
| 1,477,086 | 12/23 | Suchy | 204—87 |
| 2,383,674 | 8/45 | Osborne | 204—87 |
| 2,842,489 | 7/58 | Svanoe | 204—87 |
| 2,967,807 | 1/61 | Osborne et al. | 204—98 |
| 2,978,393 | 4/61 | Hoch et al | 204—98 |
| 3,017,338 | 1/62 | Butler et al. | 204—98 |

FOREIGN PATENTS

| | | |
|---|---|---|
| 303,857 | 1/29 | Great Britain. |
| 247,708 | 12/47 | Switzerland. |
| 253,010 | 10/48 | Switzerland. |

OTHER REFERENCES

Bredtschneider, Chem. Ztg. 80:671–3 (1956).

JOHN H. MACK, *Primary Examiner.*

JOHN R. SPECK, MURRAY TILLMAN, *Examiners.*